US008024223B2

(12) United States Patent
Cradick et al.

(10) Patent No.: US 8,024,223 B2
(45) Date of Patent: Sep. 20, 2011

(54) CUSTOMIZING AND DISTRIBUTING ADVERTISMENTS TO MOBILE DEVICES ON A COMMUNICATION NETWORK

(75) Inventors: Ryan Kirk Cradick, Oronoco, MN (US); Zachary Adam Garbow, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 734 days.

(21) Appl. No.: 11/936,844

(22) Filed: Nov. 8, 2007

(65) Prior Publication Data

US 2009/0125343 A1 May 14, 2009

(51) Int. Cl.
*G06F 17/00* (2006.01)
(52) U.S. Cl. .................................. 705/14.64
(58) Field of Classification Search ............... 705/14.64
See application file for complete search history.

(56) References Cited

U.S. PATENT DOCUMENTS

| 5,218,629 | A  | * | 6/1993  | Dumond et al. | 455/412.1 |
| 6,317,718 | B1 | * | 11/2001 | Fano | 705/14.39 |
| 6,434,530 | B1 | * | 8/2002  | Sloane et al. | 705/26 |
| 2006/0149624 | A1 | * | 7/2006 | Baluja et al. | 705/14 |

FOREIGN PATENT DOCUMENTS

GB    2 344 009    *    5/2000

* cited by examiner

*Primary Examiner* — Thomas Dixon
(74) *Attorney, Agent, or Firm* — Patterson & Sheridan, LLP (57) ABSTRACT

A method, article and apparatus for advertising via a mobile device. A communication request is received from the mobile device that includes a screen for displaying an ad. One more ad selection criteria are then determined. Such criteria may include a visibility of the ad on the screen; a target audience determined on the basis of information provided from the mobile device; and attributes of the determined target audience. The ad selection is based on the visibility of the ad and the attributes of the target audience. Commands may then be initiated to cause the selected ad to be displayed on the screen of the mobile device.

23 Claims, 5 Drawing Sheets

CUSTOMIZING AND DISTRIBUTING ADVERTISMENTS TO MOBILE DEVICES ON A COMMUNICATION NETWORK

BACKGROUND OF THE INVENTION

1. Field of the Invention

The field of the invention relates to mobile devices, specifically to advertising via mobile devices.

2. Description of the Related Art

Advertisers constantly seek out new advertising venues and means for reaching their target audiences. The Internet and consumer electronics provide access to a large audience and opportunities for new advertising techniques. For example, consumers who maintain their own web-sites have become advertising brokers via their web-sites, even though the web-sites may be otherwise non-commercial in nature. Services such as Google Adsense compensate web-site owners who agree to host advertisements "served up" by the Adsense server. By enrolling in such a service, web-site owners typically agree to link their sites to a server that enables advertisements on the web-site. When a user visits a web-site linked to a service such as Adsense, the user sees advertisements sent from the Adsense server. Other innovative advertising media and techniques are continuously being sought out.

SUMMARY OF THE INVENTION

One embodiment of the invention provides for a computer-implemented method for advertising via a mobile device. The method may generally include receiving a communication request from the mobile device. The mobile device includes a screen for displaying an ad. The method may further include determining visibility of the ad on the screen and determining a target audience on the basis of information provided from the mobile device. The method may further include determining attributes of the target audience. The method may further include selecting the ad based on the visibility of the ad and the attributes of the target audience. The method may further include initiating commands to cause the selected ad to be displayed on the screen of the mobile device.

According to one embodiment, a system for advertising comprises a mobile device. The mobile device comprises a screen for displaying ads; a telecommunications facility; and control logic. The control logic is configured to establish a network connection over which a user communicates with a target device, via the telecommunications facility. Further, during the network connection, the control logic is configured to send a communications request to a communications center via the telecommunications facility. The request includes information about a location of the mobile device. The communications center is configured to select an ad based at least in part on the information included with the request. The control logic is further configured to recognize commands from the communications center to display the ad selected by the communications center. The commands are sent by the communications center in response to the communications request. Further, the control logic is configured to display the ad on the screen, in response to recognizing the command.

According to one embodiment, a system for advertising comprises a mobile device. The mobile device comprises a screen for displaying ads; a telecommunications facility; and control logic. The control logic is configured to establish a network connection over which a user communicates with a target device, via the telecommunications facility. Further, during the network connection, the control logic is configured to send a communications request to a communications center via the telecommunications facility. The request includes information about a location of the mobile device. The communications center is configured to select an ad based at least in part on the information included with the request. The control logic is further configured to recognize commands from the communications center to display the ad selected by the communications center. The commands are sent by the communications center in response to the communications request. Further, the control logic is configured to display the ad on the screen, in response to recognizing the command.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

The present invention generally provides a method and apparatus for advertising via mobile devices. A mobile device user may subscribe to an advertising service whereby ads are displayed on the user's mobile device during communications on the device. The ads may be targeted at a likely audience of the ad. The targeted audience may be determined based on the geographic location of the user's device, and demographic data relating to potential viewers in the same geographic location.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

Figure 1:
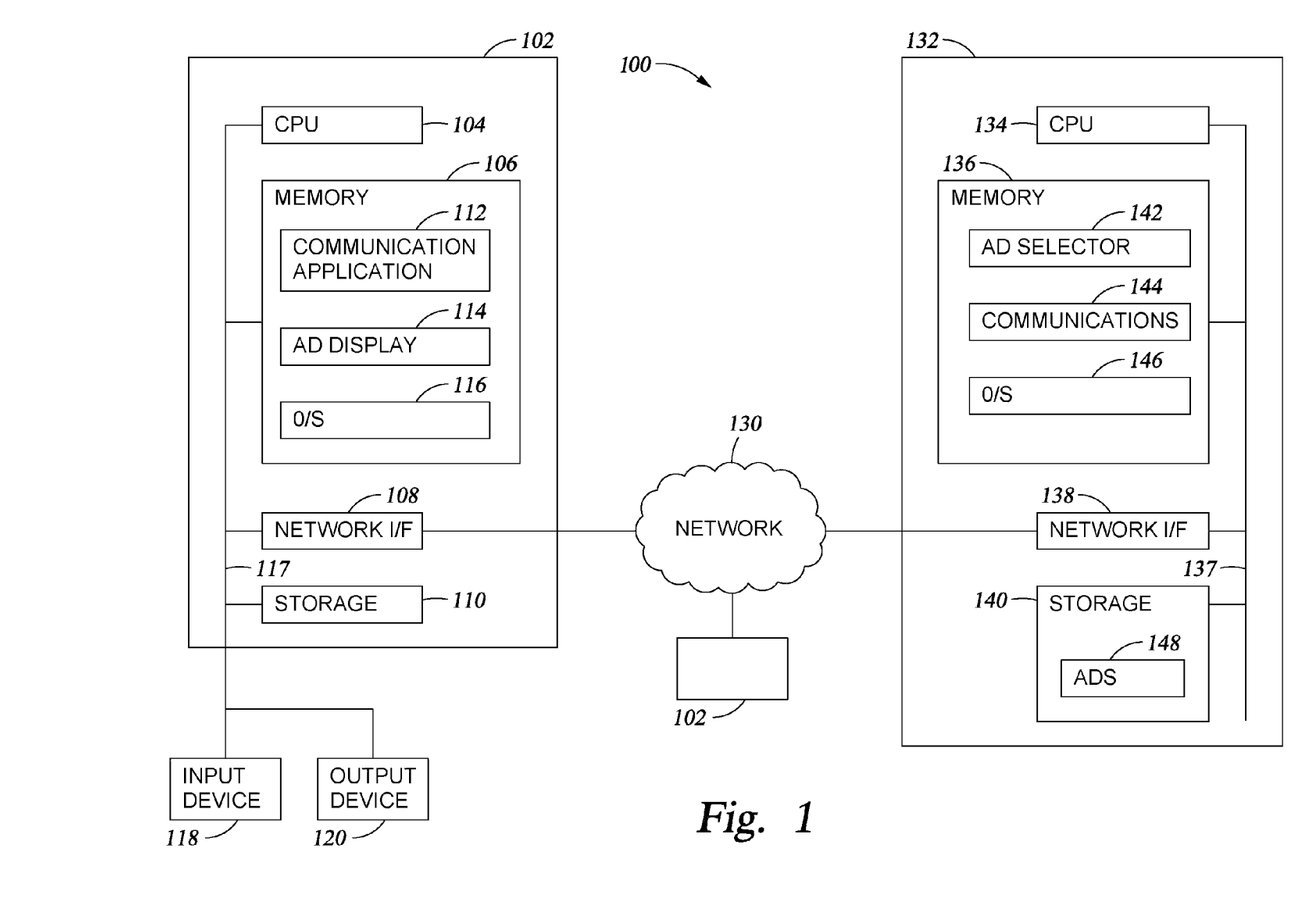
FIG. 1 is a block diagram illustrating a system for advertising via mobile devices, according to one embodiment of the invention.

FIG. 1 is a block diagram illustrating a system 100 for advertising via mobile devices, according to one embodiment of the invention. In general, the networked system 100 includes various client (e.g., user's) computers 102 (two such clients 102 are shown) and a communications server 132. The client 102 and communications server 132 are connected via a network 130. In general, the network 130 may be a telecommunications network and/or a wide area network (WAN). In a particular embodiment, the network 130 is the Internet.

The client 102 includes a Central Processing Unit (CPU) 104 connected via a bus 117 to a memory 106, a network interface (I/F) device 108, a storage 110, an input device 118, and an output device 120. The processor 104 could be any processor used to perform an embodiment the invention.

The client 102 is generally under the control of an operating system 116, which is shown in the memory 106. Examples of operating systems 116 include UNIX, versions of the Microsoft Windows® operating system, and distributions of the Linux® operating system. (Note: Linux is at trademark of Linus Torvalds in the United States and other countries.) More generally, any operating 116 system supporting the functions disclosed herein may be used.

The memory 106 is preferably a random access memory sufficiently large to hold the necessary programming and data structures of the invention. While the memory 106 is shown as a single entity, it should be understood that the memory 106 may in fact comprise a plurality of modules, and that the memory 106 may exist at multiple levels, from high speed registers and caches to lower speed but larger DRAM chips.

As is shown, the memory 106 includes a communication application 112 that, when executed on CPU 104, exchanges communications with another client 102 over network 130 via the communications server 132. Illustratively, memory 106 also includes an ad display application 114. In some embodiments, the ad display application 114 displays an advertisement on an output device 120, where the ad is transmitted from the communications server 132, and targeted at an audience in proximity to the client 102.

The network interface device 108 may be any entry/exit device configured to allow network communications between the client 102 and the ad server 132 via the network 130. For example, the network interface device 108 may be a network adapter or other network interface card (NIC).

Storage 110 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 106 and storage 110 could be part of one virtual address space spanning multiple primary and secondary storage devices.

The input device 118 can be any device to give input to the client 102. For example, a keyboard, keypad, light pen, touch-screen, track-ball, or speech recognition unit, audio/video player, and the like could be used.

The output device 120 can be any device to give output to the user or an audience for an advertisement, e.g., any conventional display screen or set of speakers, along with their respective interface cards, i.e., video cards and sound cards (not shown). Although shown separately from the input device 118, the output device 120 and input device 118 could be combined. For example, a display screen with an integrated touch-screen, a display with an integrated keyboard, or a speech recognition unit combined with a text speech converter could be used. While one output device 120 is shown, client 102 could include multiple output devices. For example, a client 102 such as a mobile phone may have a speaker and a display screen on one side of the phone for the user, and a second display on the other side of the phone for ads targeted at an audience in proximity to the mobile phone.

Communications server 132 generally comprises a CPU 134, a memory 136, a network interface device 138, and a storage device 140, coupled to one another by a bus 137. The memory 136 may be a random access memory sufficiently large to hold the necessary programming and data structures that are located on the communications server 132. The programming and data structures may be accessed and executed by the CPU 134 as needed during operation.

As shown, the memory 136 includes an ad selector application 142, a communications application 144, and an operating system 146. The ad selector 142 selects an advertisement for display on a client output device 120, based on information provided from the mobile device. The communications application 144 may facilitate the exchange of video, audio, or data traffic between a clients 102.

Storage 140 is preferably a Direct Access Storage Device (DASD). Although it is shown as a single unit, it could be a combination of fixed and/or removable storage devices, such as fixed disc drives, floppy disc drives, tape drives, removable memory cards, or optical storage. The memory 146 and storage 140 could be part of one virtual address space spanning multiple primary and secondary storage devices.

As shown, the storage 140 includes ads 148. The ads 148 are a data store of possible advertisements that the communications server 132 may transmit to the client 102 for display on the output device 120. In embodiments of the invention, ads 148 may reside in the client memory 106, the client storage 110, the server storage 140, or some combination thereof.

Figure 2:
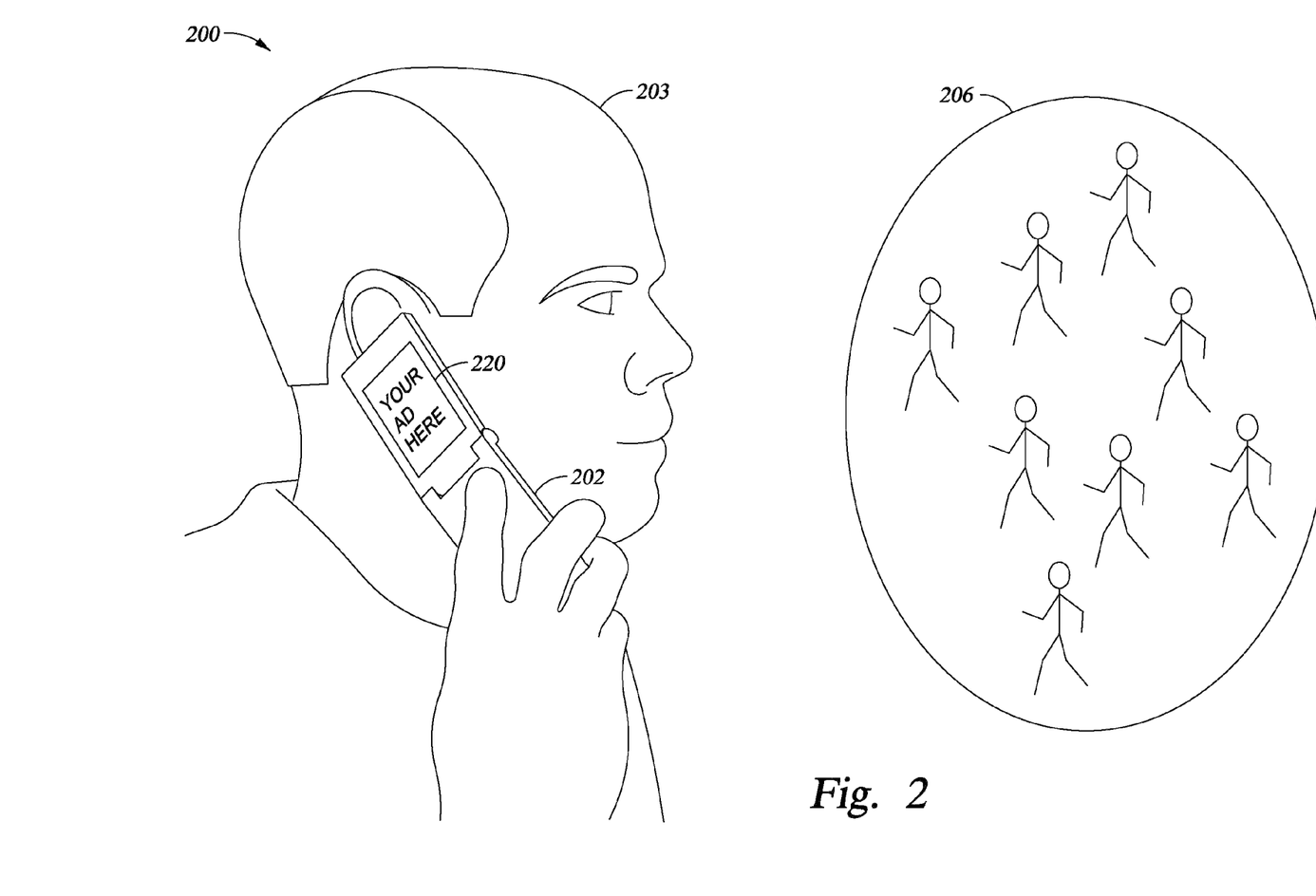
FIG. 2 illustrates an example of advertising via a mobile device, according to one embodiment of the invention.

FIG. 2 illustrates an example of advertising via a mobile device 202, according to one embodiment of the invention. An ad subscriber 203 with a mobile device 202 may sign up for an ad service, whereby the subscriber's mobile device 202 serves as advertising space to a target audience 206. In a particular embodiment, the advertising is provided to the target audience 206 during a communication over the mobile device 202.

Entities wishing to display ads on mobile devices, or sell devices with ad screens on them may provide incentives for mobile device users to subscribe to an ad service. For example, ad subscribers 203 could receive monetary awards, discounts, or coupons for allowing their devices to be used for advertising. Further, the compensation could be tied to advertising effectiveness.

For example, for ads that show web page addresses, compensation could be tied to increased network traffic to the web page, in correlation with the display of the ad on an ad screen 220. Other factors that could determine compensation in correlation with display of an ad may include, but are not limited to increased sales and income level of purchasers. More specifically, subscribers may receive a percentage of increased sales that can be correlated to the display of an ad on the subscriber's mobile device.

Alternately, or in combination with percentages of increased sales, compensation could be based on the average income level all purchasers of the product/service for purchases that can be correlated to the display of an ad on the subscriber's device. Additionally, compensation could include a percentage of repeat sales for customers whose initial sale can be correlated to the display of an ad on the subscriber's device. One skilled in the art recognizes that a myriad of compensation schemes could be developed that would provide incentive for mobile device users to subscribe to an ad service.

The target audience 206 may include members within viewing proximity of the advertising screen 220. In one embodiment of the invention, when a subscriber 203 begins a communication on the subscriber's mobile device 202, e.g. a phone call, a communications server 132 determines the target audience 206 based on information sent from the mobile device 202, and transmits an ad for display on the subscriber's mobile device 202. In some embodiments, the information sent from the mobile device 202 could include the geographic location of the mobile device. The target audience 206 could then be determined based on the geographic location of the mobile device 202.

For example, if the geographic location of the mobile device is Madison Square Garden, the target audience may be sports fans; in which case the ad displayed on the advertising screen 220 may relate to, for example, sporting events or sporting goods. The geographic location could be even more specific than a venue.

In some embodiments, the geographic location information sent from the device could be as specific as a street location. In such a case, the target audience may be residents of the street, or patrons of stores located on the street.

Figure 3:
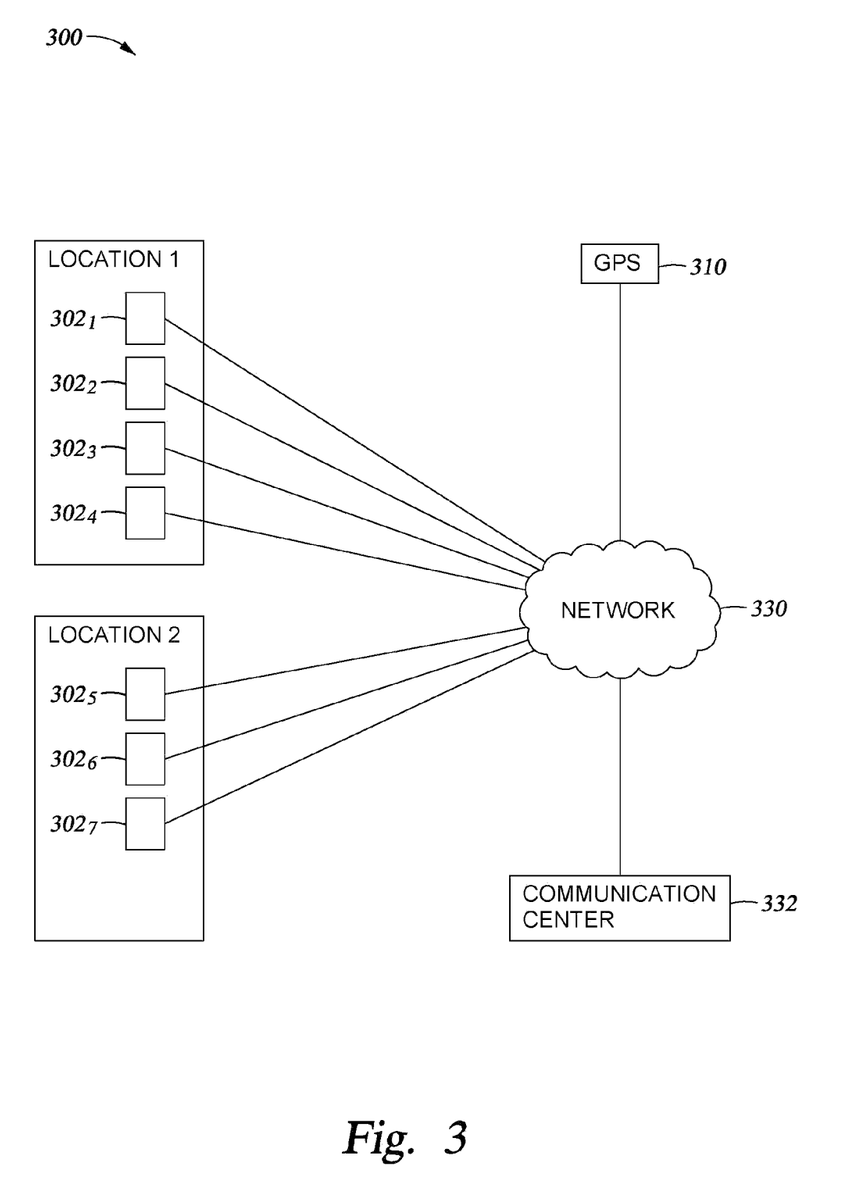
FIG. 3 is a block diagram illustrating a system for advertising via mobile devices, according to one embodiment of the invention.

FIG. 3 is a block diagram illustrating a system 300 for advertising via mobile devices, according to one embodiment of the invention. System 300 includes mobile devices 302 in "Locations 1 and 2," a global navigation satellite system 310 (such as the global positioning system (GPS)), and a communications center 332, all interconnected, linked, or otherwise coupled to a network 330. The network 330 may be any kind of network or combination of different kinds of networks supporting one or more protocols suitable for communicating the information disclosed herein.

Mobile devices 302 could be any personal communications devices capable of exchanging audio, video, or data communications over the network 330 with other mobile devices 302, a GPS 310, or a communications center 332. Mobile devices may include, but are not limited to cellular telephones, personal digital assistants (PDAs), and laptop computers.

Each location contains mobile devices of an ad subscriber, $302_1$ and $302_5$, and the mobile devices of target audiences, $302_{2-4}$ and $302_{6-7}$. Mobile devices 302 may communicate with a GPS 310 to determine their individual geographic locations. Further, mobile devices 302 may communicate their locations to a communications center 332. Accordingly, in some embodiments, a communications center 332 may determine a target audience based on the GPS coordinates of other mobile users. For example, when an ad subscriber starts a phone call on mobile device $302_1$, a communications center 332 may determine a target audience based on other mobile devices $302_{2-4}$ in the same location as the mobile device $302_1$ of the ad subscriber.

The communications center 332 performs the functions necessary to facilitate the exchange of audio, video, and/or data communications from the device 302 over the network 330 with other mobile devices 302, a GPS 310, and the communications center 332. The communications center 332 may represent one or more computer-communications facilities for cell phone, local or long-distance telephone carriers, internet service providers, or other communications service providers.

The communications center 332 may track GPS and demographic data for mobile device users that are customers of any particular communication center 332. Demographic data may be information about customers that service providers typically collect for marketing purposes. Demographic data may include, but is not limited to gender, age, income level, and size of household. Accordingly, when an ad subscriber starts a phone call on mobile device $302_1$, the communications center 332 may determine the attributes of the target audience based on demographic data of the users of other mobile devices $302_{2-4}$.

Advantageously, by using information about other mobile device users within proximity of an ad subscriber's mobile device, ads may be target to specific audiences based on information tracked by communications service providers.

Figure 4:
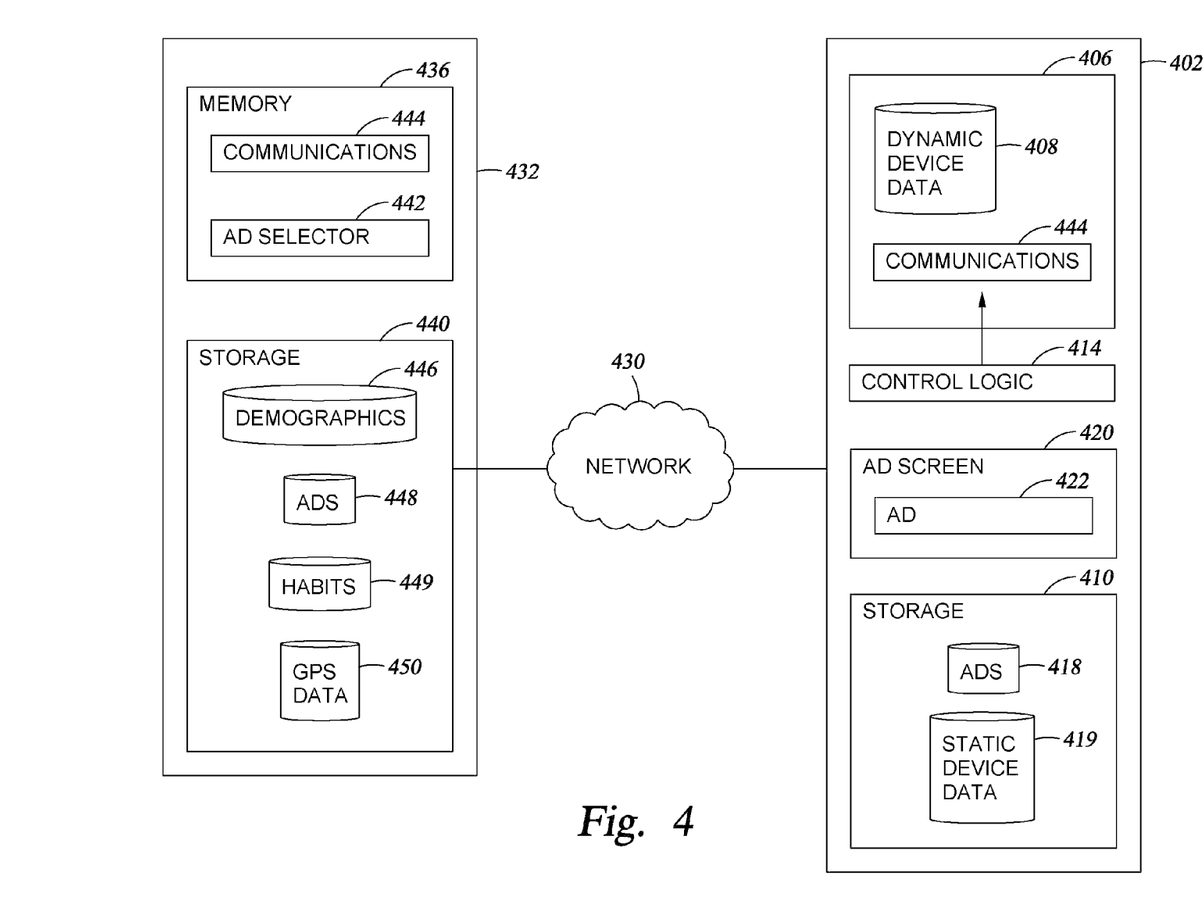
FIG. 4 is a block diagram illustrating a system for advertising via mobile devices, according to one embodiment of the invention.

FIG. 4 is a block diagram illustrating a system 400 for advertising via mobile devices, according to one embodiment of the invention. System 400 includes a mobile device 402, and a communications server 432. Mobile device 402 represents a mobile device 102 with additional detail. As shown, mobile device 402 includes a memory 406, storage 410, and an ad screen 420.

The ad screen 420 may be a supplemental display on a mobile device 402, making an ad 422 visible to a target audience. Possible locations of an ad screen 420 may include, but are not limited to the back side of a cell phone, or the opposite side of the primary display on a laptop computer. According to one embodiment, the ad screen 420 may be integrated with the mobile device. Alternatively, the ad screen 420 may be an apparatus separate from the mobile device. Such an apparatus may be attachable to, and detachable from the mobile device.

The memory 406 includes a communications application 444, dynamic device data 408, and control logic 414. Dynamic device data 408 may be stored in one or more data structures and may include dynamic (changing) information about the device 402, such as rate and direction of movement, orientation of the device 402 and ad screen 420, and GPS location of the mobile device 402. If a user with a mobile device 402 is moving, an ad selector 442 may exclude advertisements containing detail, such as text, in favor of more readily-recognizable ads, such as a brand logo. Similarly, the orientation of the device 402 may also help determine the style or content of the ad 422 displayed on the ad screen.

Control logic 414 may be configured to recognize commands sent from a communications server 432 in order to display an ad 422 on the ad screen 420. The content of the ad may reside on the communications server storage 440 (ads 448), or within the mobile device storage 410 (ads 418). According to one embodiment, the ads 448 may reside on the device 402 (not shown). In such a case, the communications server 432 may transmit instructions to the device 402 to display one of the ads residing on the device. In response, the device 402 may retrieve an ad 422 from memory 406 or storage 410 and display the ad 422 on the screen 420.

Storage 410 contains ads 418 and static device data 419. Static device data 418 may be contained in one more data structures residing in storage 410 and may describe the device 402, and a user of the device 402. Static device data 418 may be used in ad selection based on static data, such as the size of an ad screen 420 and/or the typical communication duration of a user of a device 402. For example, larger screens may be more suitable for ads with more detail, while smaller screens may be more suitable for ads with less detail. Additionally, selecting multiple ads for display on a device 402 may be appropriate for devices 402 whose users typically conduct communications of great length.

The communications server includes a memory 436 and storage 440. Storage 440 includes various data such as demographics 446, ads 448, habits 449, and GPS data 450. The demographics 446 may be include advertising-relevant data about target audiences by geographic location and venue. For example, where an ad subscriber is using a mobile device 402, demographics 446 may contain income-level data on residents of that location, or population density of the location, whether the location is a city neighborhood, a shopping mall or a sports arena.

Habits 449 may be data about advertising-relevant behaviors of target audiences. Typical behavior information could include, but is not limited to individual or group interests, and buying habits of individuals, or residents within a city neighborhood. Ad selector 442 may determine attributes of a target audience based on the information contained in habits 449. Attributes may include but are not limited to items/services of interest, spending amounts per month, and spending amounts per purchase. While the various data used as ad selection criteria, such as demographics, consumer habits, etc. are shown residing on the communication server 432, it is also contemplated that these data may be retrieved from other sources (i.e., third-party providers of such data).

GPS data 450 may contain the geographic locations of other mobile device users whose communications pass through communications server 432. According to one embodiment, ad selector 442 compares GPS data 450 with GPS information sent from the mobile device 402 to determine a target audience for ads displayed on the device 402. By determining what mobile devices are in the location, embodiments of the invention may determine who the users associated with those devices are, and determine ad-selection criteria based on demographics and habit data about those users. As described above, ad selection criteria for other mobile device users may reside on the communication server 432, or may be retrieved from other sources (i.e., third-party providers of such data).

Memory 436 includes a communications application 444 and an ad selector 442. The ad selector 442 may determine an ad for display on ad screen 422, based on the visibility of the ad 422 and the attributes of the target audience. Ad selector 442 may then transmit the ad selected from ads 448 to the device 402 for display on the ad screen 420.

The ad selector 442 may determine the visibility of an ad 422 based on dynamic device data, 408, and static device data 419, e.g., movement of the device 402, orientation of the ad screen 420, and the typical length of a communication. Additionally, the ad selector 442 may determine the target audience based on GPS data passed from the device 402, and attributes of the target audience based on GPS 450, habits 449, and demographics 446.

Figure 5:
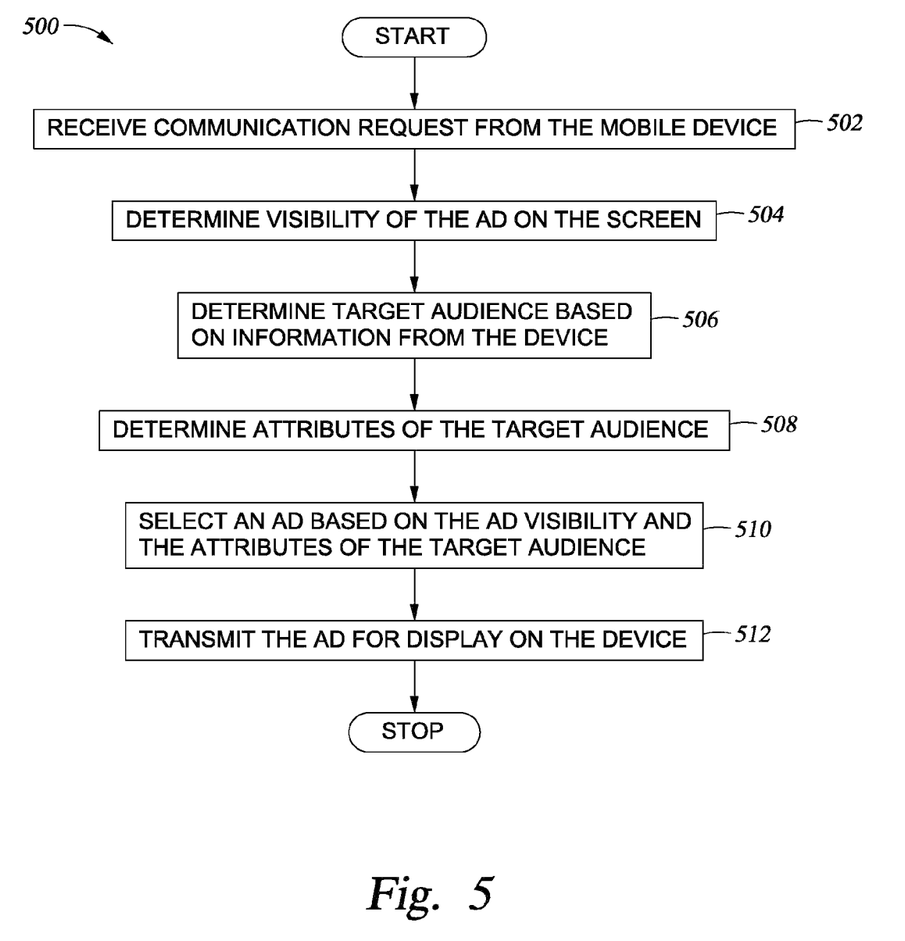
FIG. 5 is a flowchart depicting a process for advertising via mobile devices, according to one embodiment of the invention.

FIG. 5 is a flowchart depicting a process 500 for advertising via mobile devices, according to one embodiment of the invention. As shown, process 500 begins at step 502, when a communication center receives a communication request from a mobile device 402 belonging to an ad subscriber 203. The communication request may be data communications over a laptop, or a cellular telephone call.

At step 504, an ad selector 442 determines the visibility of an ad 422 on the screen 420 of the mobile device 402. The orientation and movement of the device 402, and ad screen 220 size are examples of factors that may be considered in determining ad visibility. In some embodiments of the invention, the mobile device 402 may determine the orientation and movement of the device 402. Other embodiments may determine orientation and movement of the device 402 through combinations of GPS technology and hardware/software on the device 402. Visibility of the ad may also be based on a predicted communication length. In some embodiments of the invention, the device 402 may predict communication length based on historical data of communications on the device. For example, a user may call a friend with whom the user's average call length is ten minutes. Alternatively, the user may call an employer with whom the average call length is less than two minutes. In such a case, the device 402 may determine a higher visibility level for ads displayed during calls to the friend than calls to the employer.

At step 506, the ad selector 442 determines a target audience based on information received from the device 402. The device 402 may pass its GPS location to a communication server 432. Further, the ad selector 442 may compare the location of the device 402 to GPS data 450 about other mobile device users at the location of the device 402, to determine the target audience, i.e., potential viewers of an ad on the device 402.

At step 508, the ad selector 442 may use the GPS data 450, habits 449, and demographics 446 to determine the attributes of the target audience. At step 510, the ad selector 442 selects an ad for display on the device based on the ad visibility and the attributes of the target audience.

For example, an ad subscriber may make a cell phone call from a basketball arena. In such a case, the ad selector 442 may select an ad for sports equipment to be displayed on the ad screen 420. If the visibility of the ad is low because the screen is angled down in relation to many viewers, the ad selector 442 may instead select a sports equipment-maker's logo for display on the device's screen 420. At step 510, the ad selector 442 transmits the ad for display on the device 402.

While the foregoing is directed to embodiments of the present invention, other and further embodiments of the invention may be devised without departing from the basic scope thereof, and the scope thereof is determined by the claims that follow.

What is claimed is:

1. A computer-implemented method for advertising via a mobile device, comprising:
   receiving a communication request from the mobile device when a user of the mobile device communicates with a target device, wherein the mobile device includes a screen for displaying an ad;
   during the user communication, determining visibility of the ad on the screen;
   determining a target audience on the basis of information provided from the mobile device;
   determining attributes of the target audience;
   selecting the ad based on the visibility of the ad and the attributes of the target audience; and
   during the user communication, initiating commands to cause the selected ad to be displayed on the screen of the mobile device.

2. The method of claim 1, wherein the mobile device is provided with the ad pursuant to an ad service to which a user of the mobile device subscribes.

3. The method of claim 1, wherein determining the visibility of the ad comprises at least one of:
   predicting a length of the communication;
   determining a size of the screen;
   determining an orientation of the screen; and
   determining movement of the mobile device.

4. The method of claim 1, wherein the screen is detachable from the mobile device.

5. The method of claim 1, wherein determining the attributes of the target audience comprises at least one of:
   determining a street location of the mobile device;
   determining a venue of the mobile device;
   determining audience demographics; and
   determining audience habits.

6. The method of claim 5, wherein determining the audience demographics is based on at least one of the following:
   the street location;
   the venue; and
   demographics of a plurality of other mobile device users.

7. The method of claim 1, wherein a user of the mobile device receives compensation in exchange for allowing the mobile device to be used as an advertising medium for the selected ad.

8. The method of claim 7, wherein an amount of the compensation is based on at least one of the following in correlation with the selected ad displayed on the screen:
   increased network traffic for an advertised network site;
   increased sales for advertised products;
   increased sales for advertised brands;
   income level of purchasers; and
   repeat sales by purchasers.

9. A computer-readable storage medium containing a program which, when executed, performs an operation, comprising:
   receiving a communication request from the mobile device when a user of the mobile device communicates with a target device, wherein the mobile device includes a screen for displaying an ad;
   during the user communication, determining visibility of the ad on the screen;
   determining a target audience on the basis of information provided from the mobile device;
   determining attributes of the target audience;
   selecting the ad based on the visibility of the ad and the attributes of the target audience; and
   during the user communication, initiating commands to cause the selected ad to be displayed on the screen of the mobile device.

10. The computer-readable storage medium of claim 9, wherein the mobile device is provided with the ad pursuant to an ad service to which a user of the mobile device subscribes.

11. The computer-readable storage medium of claim 9, wherein determining the visibility of the ad comprises at least one of:
   predicting a length of the communication;
   determining a size of the screen;
   determining an orientation of the screen; and
   determining movement of the mobile device.

12. The computer-readable storage medium of claim 9, wherein the screen is removably attached to the mobile device.

13. The computer-readable storage medium of claim 12, wherein determining the attributes of the target audience comprises at least one of:
   determining a street location of the mobile device;
   determining a venue of the mobile device;
   determining audience demographics; and
   determining audience habits.

14. The computer-readable storage medium of claim 13, wherein determining the audience demographics is based on at least one of the following:
   the street location;
   the venue; and
   demographics of a plurality of other mobile device users.

15. The computer-readable storage medium of claim 9, wherein a user of the mobile device receives compensation in exchange for allowing the mobile device to be used as an advertising medium for the selected ad.

16. The computer-readable storage medium of claim 15, wherein an amount of the compensation is based on at least one of the following in correlation with the selected ad displayed on the screen:
   increased network traffic for an advertised network site;
   increased sales for advertised products;
   increased sales for advertised brands;
   income level of purchasers; and
   repeat sales by purchasers.

17. A system for advertising via a mobile device, comprising:
   a processor,
   a memory containing a program, which when executed by the processor is configured to:
      receiving a communication request from the mobile device when a user of the mobile device communicates with a target device, wherein the mobile device includes a screen for displaying an ad;
      during the user communication, determine visibility of the ad on the screen;
      determine a target audience on the basis of information provided from the mobile device;
      determine attributes of the target audience;
      select the ad based on the visibility of the ad and the attributes of the target audience; and during the user communication, initiate commands to cause the selected ad to be displayed on the screen of the mobile device.

18. The system of claim 17, wherein the program, when executed by the processor, is further configured to determine the visibility of the ad by performing at least one of:
predicting a length of the communication;
determining a size of the screen;
determining an orientation of the screen; and
determining movement of the mobile device.

19. The system of claim 17, wherein the program, when executed by the processor is further configured to determine the attributes of the audience by performing at least one of:
determining a street location of the mobile device;
determining a venue of the mobile device;
determining audience demographics; and
determining audience habits.

20. A system for advertising, comprising:
a telecommunications facility; and
a mobile device, comprising:
 a screen for displaying ads; and
 control logic configured to:
  establish a network connection over which a user communicates with a target device, via the telecommunications facility;
  during the network connection:
   send a communications request to a communications center via the telecommunications facility, the request including information about a location of the mobile device, wherein the communications center is configured to programmatically select an ad based at least in part on the information included with the request;
   recognize commands from the communications center to display the ad selected by the communications center, the commands being sent by the communications center responsive to the communications request; and
   display the selected ad on the screen, in response to recognizing the command.

21. The system of claim 20, wherein the network connection is a telephone connection supporting a voice communication exchange.

22. The system of claim 20, wherein the telecommunications facility is configured to exchange voice, video, and data traffic over networks.

23. The system of claim 20, wherein the communications center programmatically selects an ad based on at least one of the following:
a predicted length of the communication;
a size of the screen;
an orientation of the screen; and
movement of the mobile device.

* * * * *